Jan. 13, 1959  L. E. PATTEN ET AL  2,868,656
METHOD OF COATING FOOD ARTICLES AND
PRODUCT OBTAINED THEREBY
Filed Dec. 23, 1957

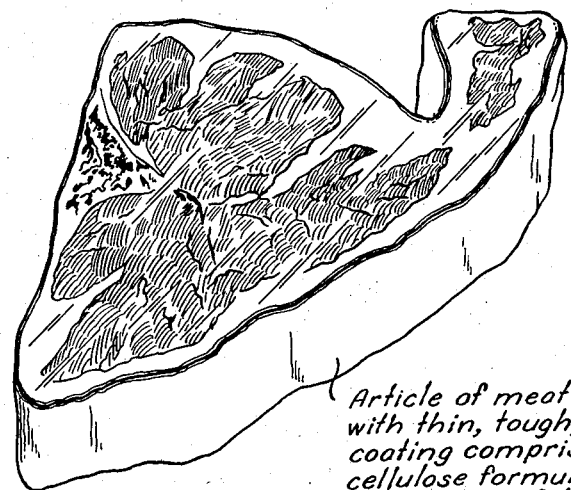

Fig. 1

Article of meat provided with thin, tough, peelable coating comprised of ethyl cellulose formulated with edible food fat or oil

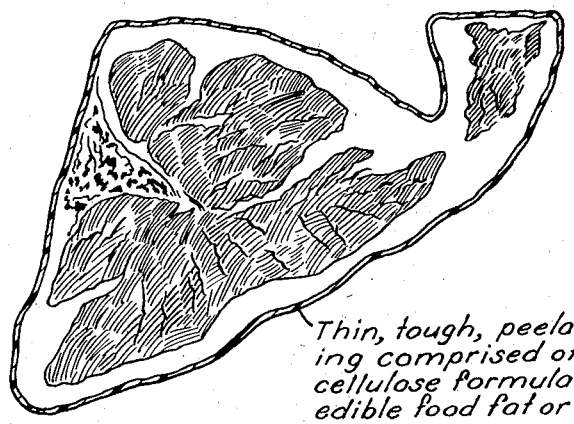

Fig. 2

Thin, tough, peelable coating comprised of ethyl cellulose formulated with edible food fat or oil INVENTORS
Lorraine E. Patten
Harold C. Kelly BY Griswold & Burdick
ATTORNEYS.

United States Patent Office 2,868,656
Patented Jan. 13, 1959

2,868,656

METHOD OF COATING FOOD ARTICLES AND PRODUCT OBTAINED THEREBY

Lorraine E. Patten and Harold C. Kelly, Midland, Mich., assignors to The Dow Chemical Company, Midland, Mich., a corporation of Delaware Application December 23, 1957, Serial No. 704,667

18 Claims. (Cl. 99—166)

This invention relates to coating compositions comprising cellulose ethers which are especially suited for enveloping certain articles of food, particularly meat and meat products, in tightly-adhering, protective coatings which may be readily stripped or peeled from the article. More particularly, it is concerned with such coating compositions that are applied from, or while they are in, the molten condition. Compositions of the indicated nature are frequently referred to as "hot melts" and are accordingly characterized throughout the following description and specification. The present invention also has reference to a method for coating food articles with the referred-to compositions and to coated articles thereby obtained.

It would be advantageous to provide certain articles of food, particularly meat and meat products, with tough, closely conforming coatings which have protective and preservative value and which could be readily removed by clean and efficient stripping or peeling operations. It would be additionally beneficial for such a coating to be imbued with other desirable characteristics, including flexibility at temperatures which are commonly encountered in refrigerators and food freezers; attractive appearance and good color stability; relatively high impermeability to gases and water and other common vapors to minimize or prevent the occurrence of intolerable oxidation, dehydration or contamination in the coated foodstuff; and, as a primary requirement, absolute non-toxicity, i. e., freedom from any tendency to transfer deleterious or harmful materials to the foodstuff. A cognate benefit would be for the coatings to be comprised of edible constituents having positive nutritive value. In this way, the wholesomeness of the foodstuff would not in the slightest be detracted from in the event of inseparable permeation thereinto of the coating. It would be of even greater advantage and desirability if a good proportion of the coatings would be available in a relatively transparent condition, or in a condition in which they were at least free from excessive opacity, in order to permit visual inspection of the coated article. It would be an exceptional advantage of a pronounced benefit for such coatings to be obtainable from readily available and inexpensive materials and to be utilizable in a convenient and economical manner.

These desiderations and many other advantages and benefits which hereinafter are manifest may be realized with and achieved by coating compositions that are in accordance with the present invention which are basically and essentially composed or comprised of a mixture that consists essentially of between about 20 and 50 percent by weight of ethyl cellulose; between about 25 and 65 percent by weight of an oleaginous constituent that is composed of at least a portion, and frequently all, of an edible natural (i. e., derived from animal or vegetable source) fat or oil, any balance being a refined mineral oil; and between about 10 and 25 percent by weight of a non-toxic plasticizer which is a solvent for the cellulose ether. Advantageously, compositions that are in accordance with the present invention may also be prepared so as to contain up to about 10 percent by weight, based on the weight of the composition, of an acid-accepting, epoxidized long chain fatty acid triglyceride or the like constituent; up to about 2 percent by weight of a non-toxic antioxidant component; and up to about 2 percent by weight of a suitable color-stabilizing ingredient.

All of the compositions of the present invention ordinarily form molten mixtures at temperatures that are in excess of the boiling point of water. The hot melts that are formed have very good resistance to discoloration and excellent viscosity stability, even upon prolonged exposure to heat in the molten condition. The hot melts may be applied in any desired manner to articles which may be at any temperature beneath that of the hot melt. Advantageously, particularly when fresh meat or meat products are involved, the coating composition may be applied by a method which comprises freezing the article, or at least the surface of the article of food to be coated; and coating the frozen article with the molten composition. Such a method is beneficial in that the surface of the article being coated, particularly meats and the like, is less likely to thus be subjected to discoloring temperatures and vaporization of surface juices.

Brushing, spraying, splashing, dipping and other techniques may be employed in order to apply the beneficial coating compositions of the invention to the articles being coated. It is frequently expedient to employ dip coating techniques for this purpose, wherein the articles are dipped in a suitable molten composition to effect the coating "pickup," after which they are withdrawn and the applied coating composition permitted to cool and harden. In many cases, however, particularly when high production rates must be attained, it is exceptionally expedient to employ spray or splash coating techniques in order to manufacture the desired coated articles, wherein each of the articles to be coated is passed under or over, or both, one or more sprays of the molten compositions or through one or more curtains or sheets thereof, or is otherwise splashed thoroughly therewith, to cover their entire surface in order to effect the desired "pick-up" of the coating. The precise constitution of the compositions that are employed may vary according to preferred embodiments, as will hereinafter be more fully delineated, each depending somewhat for optimum effect on the precise coating technique that is intended to be employed. In this way, under any given conditions of the application, the operation may be most beneficially facilitated and the most effective and advantageous application of the desired coating provided on the articles.

Coated articles of food, particularly meats, in accordance with the present invention generally have an attractive and pleasing appearance. As a matter of fact, many of the coatings that may be provided in accordance with the present invention using certain edible oleaginous constituents in the composition have highly attractive and exceptionally pleasing appearances in this regard, being quite transparent, over a wide temperature range, even at temperatures as low as those in the neighborhood of about −20° F. and lower so as to easily accommodate ready visual inspection and evaluation of the foodstuff.

The coatings which are provided on and for food articles by practice of the present invention adhere tightly as a thin film about the articles and conform closely to their contours, even when bony meats or fowl are involved. They are non-toxic and odorless and do not impart odors or tastes to the food being coated. They are readily peelable, cuttable or strippable in a clean and efficient manner from the article of food. Thus, they do not require resort to washing or other tedious and inconvenient procedures for their complete removal.

As indicated, the coatings are relatively flexible and remain remarkably strong and tough at temperatures as low as about −20° F. Thus, they are well adapted to resist damage due to handling (including severe scuffing and jostling) and storage of a coated article being maintained in a frozen condition. They also have an extremely low rate of water vapor transmission. Their characteristics in this regard are comparable to those which are found in other distinct varieties of ethyl cellulose type coatings. As a consequence, the coated articles may be preserved in a better condition and are less susceptible to becoming rancid or dehydrated or to develop "freezer burn." Despite their advantageous relative impermeability, however, the coatings of the present invention are adapted to permit passage of sufficient oxygen so that coated fresh meats, for example, can readily retain their desirably fresh and natural bright red color. In addition, the applied coating compositions of the present invention effectively prevent the absorption of undesirable foreign odors and tastes in the food product.

The ethyl cellulose which may be employed in the practice of the present invention is a commonly available material having an ethoxyl content in the range from about 47.5 to about 50 percent by weight. In many cases it may be desirable to utilize a cellulose ether having an ethoxyl content of from about 48.0 to 49.5 percent by weight. Its viscosity, as determined in a solution of about 5 percent by weight of the ethyl cellulose in a solvent mixture consisting of about 80 parts by volume of toluene and by about 20 parts by volume of ethanol, may be from about 6 to about 200 centipoises (cps.) In many cases, it is more convenient and may be of greater expediency and practicality to employ a cellulose ether having a viscosity that is not in excess of about 50 cps. The particular viscosity grade of cellulose ether that is employed as well as the precise formulation of composition that is utilized depends, as has been indicated, upon the manner of application contemplated for the particular composition being used to coat the articles. For example, when a dip application of the coating is intended to be made, the viscosity of the cellulose ether that is employed should not be in excess of about 30 cps., and, even more beneficially, may be in the neighborhood of 6 to 11 cps. When the coating is to be applied by spraying or splashing techniques which are generally accomplished by means of apparatus or machinery which is adapted for such purpose, a higher viscosity cellulose ether may generally be utilized and a more viscous overall composition employed.

As mentioned, the oleaginous constituent that is employed in the compositions of the present invention is composed of at least a portion of an edible natural fat or oil which can itself be employed, inter alia, as a food and which may be derived from either animal or vegetable sources. Of course, mixtures of various animal and vegetable fats and oils can be employed, if so desired. In certain instances, as when corn oil is employed, all of the oleaginous constituent can consist of the vegetable oil without any refined mineral oil being present in the composition. In addition to corn oil, other animal or vegetable food oils or fats such as lard, coconut oil, peanut oil, cottenseed oil, soya bean oil or hydrogenated vegetable oils can be used. The hydrogenated vegetable oils which may be utilized are of the type that are conventionally employed as a shortening and for other cooking purposes, such as those which are available commercially under the tradenames "Crisco" and "Spry." Excepting in the instances when certain vegetable oils, such as corn oil or a mixture of corn oil and refined mineral oil, are employed as the oleaginous constituent in the compositions of the invention, the presence and use of most edible natural oils or fats in the hot melts usually causes the applied coating to have a slight haze at room temperature and to be relatively opaque at lower temperatures, particularly those which are encountered in food freezers. Such a condition is not always intolerable or objectionable, however. Thus, it may be more or less inconsequential when the coating is being used on foodstuffs being handled in other than the retail trade, as in manufacturing and packing establishments, for bulk storage and warehousing purposes, and in many institutional uses.

The edible oil or fat-containing coatings of the present invention, including the completely transparent coatings containing corn oil, tend to have a somewhat oily surface due to exudation of the natural fat or oil constituent. This tendency is much more pronounced at room temperatures than under cooler or freezing conditions. As is the situation with the condition of transparency of the coating, however, a slight oil exude on the surface of the coating is a relatively immaterial factor in the eyes of many large scale users of the commodity.

The refined mineral oil constituent that may be present in the compositions of the present invention is one that is of the paraffinic variety, or an equivalent material derived from a naphthenic petroleum source. It is desirable and ordinarily preferable for light color or water white mineral oils to be employed. Mineral oils having a viscosity in the range from about 80 to about 400 Saybolt units at 100° F. are ordinarily most advantageous to employ.

The precise quantity of edible natural fat or oil that is employed in the present compositions depends upon the specific nature of the natural oleaginous constituent being employed. Thus, as has been indicated in the foregoing, all of the oleaginous constituent of the hot melt composition may be a natural oil when corn oil is employed. When other normally liquid vegetable oils are employed, such as peanut, cottonseed, soya bean or coconut oil, as much as about two-thirds (i. e., up to about 40 percent by weight of the composition) of the oleaginous constituent may be comprised of any of the indicated varieties of vegetable oils in mixture with the refined mineral oil. When normally solid vegetable oils or animal fats (such as hydrogenated vegetable oils, lard or the like) are employed they may generally comprise as much as about one-third of the oleaginous constituent in mixture with the refined mineral oil (i. e., up to about 20–25 percent by weight of the composition).

Suitable operative ranges of the various compositions of the present invention are, for sake of clarifying particularization, set forth in the following tabulation which indicates satisfactory formulations with each general type of natural edible oleaginous constituent that may be utilized. All proportions are in percent by weight of the total composition.

RECIPE I.—SUITABLE FORMULATIONS

| Ingredient | Using Normally Solid Natural Fat | Using Corn Oil | Using Normally Liquid Natural Oils Other Than Corn Oil |
|---|---|---|---|
| Ethyl Cellulose | 20–50 | 20–50 | 20–50 |
| Non-toxic Plasticizer | 10–25 | 10–25 | 10–25 |
| Refined Mineral Oil | 20–65 | 0–65 | 20–65 |
| Edible Natural Food Fat Or Oil | 0–25 | 0–65 | 0–40 |
| Epoxidized Natural Glyceride of Unsaturated Fatty Acids | 0–10 | 0–10 | 0–10 |
| Antioxidant | 0–2 | 0–2 | 0–2 |
| Color Stabilizer | 0–2 | 0–2 | 0–2 |

The plasticizer or plasticizing component which is utilized should be a solvent for the cellulose ether which is compatible with other constituents of the composition. Suitable plasticizers for practice of the present invention include such colorless, odorless and non-toxic materials as those which are ester plasticizers for ethyl cellulose, such as alkyl phthalyl alkyl glycolates (specifically methyl phthalyl ethyl glycolate; ethyl phthalyl ethyl glycolate; and butyl phthalyl butyl glycolate); trialkyl esters of acyl citric acid (specifically acetyl tributyl citrate such as that which may be obtained under the trade-designation "Citroflex A-4"); dialkyl adipates (specifically di-isobutyl adipate); various acetylated mono- and di-fatty acid glycerides; certain trialkyl phthalates (specifically di-2-ethylhexyl-phthalate); various fatty acid ester derivatives (including glycerol mono-oleate; glycerol mono-stearate; and n-butyl stearate); alkyl-aryl phosphates; castor oil; and the like. It may frequently be beneficial to employ mixtures of various plasticizing materials in the hot melt compositions. The plasticizer acetyl tributyl citrate may be utilized with great advantage for purposes of the invention. Castor oil may also be employed with benefit and such plasticizers as butyl phthalyl butyl glycolate are likewise quite suitable for use.

The epoxidized long chain fatty acid triglycerides that may be employed in the practice of the present invention are useful to inhibit hydrolytic degradation of the ethyl cellulose. Such materials are sometimes referred to as being epoxidized natural glycerides of unsaturated fatty acids. Ordinarily, they are derived from fatty acids that contain between about 12 and 22 carbon atoms. Such acid-accepting epoxy materials may be specifically typified and particularlized by such compositions as epoxidized soya bean oil, including those products of this variety which may be obtained under the trade designations "Paraplex G-60" and "Paraplex G-62," respectively.

Various non-toxic antioxidants are also advantageous to employ in the compositions of the invention in order to inhibit oxidative degradation of the ethyl cellulose and any fatty acid glycerides that may be present therein. Typical of such antioxidants are butylated hydroxy anisol; nordihydroguaiaretic acid; 2,6-ditertiary butyl-4-methyl phenol which is obtainable under the trade-designation "Ionol"; certain substituted butylated phenols such as those which are commercially available under the trade-designation "Voidox," and 2,2'-thiobis (4-methyl-6-tert. butyl phenol) which may be obtained commercially as "Santonox."

It is beneficial in many instances to incorporate certain non-toxic color stabilizers in the compositions to facilitate the retention of a desirably clear and free from discoloration condition in the coating. Advantageously, the color stabilizers that may be utilized are such organic acids as citric acid, tartaric acid and other polycarboxylic acids, including hydroxy polycarboxylic acids, especially those comprised of from 2 to about 6 carbon atoms in their molecules. Other color stabilizers which may be employed include various organic phosphites such as tricresyl phosphite and mixed organic phosphite-epoxy compounds including those that may be obtained commercially under the trade-designations "Advastab CH-49" and "Advastab CH-201."

Frequently, the greatest advantage and benefit may be achieved in the practice of the present invention when the coating compositions are prepared with corn oil as an oleaginous constituent, especially when it is in mixture with refined mineral oil, and particularly when certain combinations of other ingredients are employed. Accordingly, in the following tabulation there are set forth highly satisfactory mixtures and a typical exact corn oil formulation for use for the present purposes. As before, all numerical proportions in the table are in percent by weight of the total composition.

RECIPE II.—CORN OIL FORMULATIONS

| Ingredient | Optimum Range | Typical Composition |
|---|---|---|
| Ethyl Cellulose | a 23-30 | b 30 |
| Acetylated Mono-glyceride | d 1-3 | 1.5 |
| Glycerol Mono-oleate | d 1-3 | 1.4 |
| Castor Oil | d 8-11 | 10 |
| Epoxidized Natural Glyceride of Unsaturated Fatty acids | 1-5 | 2.0 |
| Refined Mineral Oil c | 25-35 | 30 |
| Corn Oil | 25-35 | 30 |

Note:
a Viscosity—50 cps. or less.
b Std. grade—10 cps. "Ethocel".
c Average viscosity at 100° F. ca. 100 Saybolt units.
d Optimum range of total combined plasticizer components is from 10 to 17 percent.

In preparing the hot melt coating compositions of the present invention, care should be taken to select such relative proportions of the ingredients as will produce a coating having optimum characteristics within the range dictated by its own inherent limitations. In addition, as has been indicated, both the proportions and the nature of the specific ingredients employed should take into account the type of application intended for the composition, particularly with respect to the viscosity of the cellulose ether constituent and the proportion of the oleaginous constituent that may be employed. Thus, with some combinations of ingredients, a larger proportion of the ethyl cellulose or a higher viscosity grade of such constituent may produce a more viscous hot melt than is desirable for particular operating temperatures or particular modes of application whereas smaller proportions, in some instances, may not lend sufficient strength to the film coating. Smaller quantities of the oleaginous constituent may also increase the viscosity of the hot melt. Similarly, greater amounts of the oleaginous constituent may sometimes tend to yield an excessively oily film coating. In an analogous manner, too much plasticizer may at times produce a film coating which is softer and more oily than might be otherwise obtained. The same consequences may result from various combinations of the epoxidized natural glyceride of unsaturated fatty acids (when such constituent is utilized) especially in its combination with the plasticizing ingredient. On the other hand, the use of too small a quantity of the plasticizer may, in certain instances, impart undesirable brittle characteristics to the film coating.

Although any desired thickness of coating may be applied on a given foodstuff, a properly formulated composition should permit applied film thicknesses to be obtained by hot dipping techniques that are between about 25 and 100 mils, and advantageously from about 50 to 85 mils, with a single immersion and moderately slow withdrawal (say, within several seconds) of the article desired to be coated. Of course, as can readily be appreciated, generally thinner or thicker coatings can be obtained, if desired, by variations in applicating technique, as will be apparent to those skilled in the art (especially when other than dip coating techniques are utilized). As a matter of fact, it may oftentimes be economically attractive for the thickness of the applied coatings to be in the neighborhood of 10–15 mils, or so.

Since the hot melt compositions of the present invention are at relatively high temperatures during their application, it is advantageous to coat many articles while they are in a frozen condition. This minimizes the possibility of causing slight surface discoloration and dehydration of the foodstuff, particularly when meat and meat products are being coated. It also obviates any objections to the coated articles which may arise for such reasons. The discolorations which may occur from coating food articles at normal temperatures are innocuous, however, and bear no relationship to their quality or wholesomeness in any consideration other than appearance.

Thus, if it is otherwise suitable, articles which are not in a frozen condition may be satisfactorily coated with the compositions of the present invention. As a matter of fact, there are many instances when so significant advantage may be derived by chilling or freezing the article before coating. This may be the case, for example, when various smoked or cured meats, fish or fowl are being coated. The normal, treated appearance of such foodstuffs is acceptable and does not detract from their marketability, although they actually are discolored from a natural condition.

The invention is further illustrated in and by the following examples wherein, unless otherwise indicated, all parts and percentages are to be taken by weight.

Example A

Various cuts of beef and pork were coated by first freezing and then dip coating them with a hot melt at about 320° F. which was comprised of about 25.0 parts of ethyl cellulose of a viscosity grade of about 10 cps. ("Ethocel"); about 30 parts of a refined mineral oil mixture which consisted of a refined mineral oil having a viscosity between about 95 and 105 Saybolt units at 105° F. ("White Oil L–1"); about 30 parts of corn oil; and about 12.9 parts of a plasticizer combination consisting of about 10 parts of a refined and deodorized castor oil ("Crystal-O"); 1.5 parts of an acetylated monoglyceride ("Myvacet 9–40"); and about 1.4 parts of glycerol monooleate ("Myverol 18–71"). The hot melt, which had a slightly yellow color, had excellent color and viscosity stability. After the dipping the applied coating was allowed to cool and harden. All of the coated articles, as schematically illustrated in a perspective view in Figure 1 and in cross-section in Figure 2 of the accompanying drawing, had an attractive and pleasing appearance and were only slightly oily to the touch. The applied coating adhered tightly to each of the articles and conformed closely to them as a thin enveloping film about their various irregular contours. It was completely transparent, allowing visual inspection of the coated articles which retained their essential natural appearances. The coating was remarkably tough and did not become embrittled at freezing temperatures. It did not rupture upon repeated dropping of the frozen articles or even when the articles were subjected to such purposely abnormal and abusive handling as being repeatedly thrown and skidded over concrete floors. It could be stripped cleanly from the articles without perceptible remnants or segments of the coating adhering to the foodstuff. This permitted the articles to be obtained in their normally available condition after being freed of the coating. In addition, the coating provided excellently indefinite protection against weight loss or "freezer burn." Thus, no appreciable indications of such conditions are observed in coated articles that are maintained in a frozen condition for periods as long as a year or more.

About the same results were obtained with a similar composition prepared containing, in addition to the tested ingredients, about 2.0 parts of "Paraplex G-62."

Equivalent results are similarly obtainable with other types and varieties of meat, and with poultry, if care is taken to suitably plug or cover the cavities in their dressed carcasses. Various cheeses may also be coated satisfactorily with the above hot melt composition and others in accordance with the invention.

Example B

Formulations similar to that set forth in Example A were prepared excepting to substitute for the oleaginous constituent employed therein (1) all corn oil; (2) mixtures of the mineral oil with from 2 to 20 percent on the weight of the composition of both lard and "Crisco"; and mixtures of the mineral oil with from 2 to 40 percent on the weight of the composition of either peanut oil, cottonseed oil, soya bean oil or coconut oil. Excellent results were obtained when the coatings were applied. Each of the coatings were tough, flexible at low temperatures, and readily strippable from the articles. Excepting for the corn oil formulation (which provided coatings that were remarkably pellucid at any temperature), all of the coatings were slightly hazy at room temperatures and developed opaqueness upon freezing.

Similar excellent results are obtained when the procedures of the foregoing examples are repeated with higher viscosity grades of ethyl cellulose.

It is to be fully understood that the scope and purview of the present invention is to be construed from the following claims rather than strictly from the foregoing docent specification and description.

What is claimed is:

1. Method for coating articles of food which comprises the steps of (1) applying to the article, while it is being maintained at a relatively lower temperature, a thin enveloping film of a coating from a composition in molten form composed essentially of (a) from 20 to 50 percent by weight of the composition of an ethyl cellulose having an ethoxyl content between about 47.5 and 50 percent by weight and a viscosity between about 6 and 200 centipoises, as determined in a 5 percent by weight solution thereof in an 80:20 mixture, by volume, of toluene and ethanol; (b) between about 20 and 65 percent based on the weight of the composition, of an oleaginous constituent that is composed of an edible oleaginous food material derived from natural sources, any balance being a refined mineral oil having a Saybolt viscosity at 100° F. between about 80 and 400 units; and (c) between about 10 and 25 percent by weight, based on the weight of the composition, of a colorless, odorless, non-toxic plasticizer component which is a solvent for the cellulose ether; and (2) cooling the applied coating on the article to a hardened condition.

2. The method of claim 1, wherein said article of food is in a frozen condition during the application of said composition.

3. The method of claim 1, wherein said composition is applied to the article by dip coating the composition thereon and wherein the ethyl cellulose has a viscosity not in excess of about 30 centipoises.

4. The method of claim 1, wherein said composition is composed of from about 23 to 30 percent by weight, based on the weight of the composition, of ethyl cellulose having a viscosity not in excess of about 50 centipoises; from 25 to 35 percent by weight of corn oil; from about 25 to 35 percent by weight of said refined mineral oil; and from 10 to 17 percent by weight of said no-toxic plasticizer component.

5. A method in accordance with the method set forth in claim 4, wherein said plasticizer component is composed of from about 1 to 3 percent by weight of an acetylated monoglyceride; from about 1 to 3 percent by weight of glycerol mono-oleate; and from about 8 to 11 percent by weight of castor oil.

6. The method of claim 1, wherein said oleaginous constituent in said composition is composed entirely of corn oil.

7. The method of claim 1, wherein said oleaginous constituent in said composition is composed of a mixture of corn oil and refined mineral oil.

8. The method of claim 1, wherein said mixture of corn oil and mineral oil in said composition contains about equal weight proportions of each.

9. The method of claim 1, wherein said oleaginous constituent in said composition is composed of a mixture of a normally liquid vegetable oil other than corn oil with refined mineral oil that contains not more than about two-thirds of said vegetable oil.

10. The method of claim 1, wherein said oleaginous constituent in said composition is composed of a mixture of a normally solid edible fat with refined mineral oil that contains not more than about one-third of said edible fat, said edible fat being selected from the group consisting of lard and hydrogenated vegetable oil.

11. The method of claim 1, wherein said composition contains in combination therewith and in addition thereto, up to about 10 percent by weight of an epoxidized long chain fatty acid triglyceride derived from unsaturated fatty acids, which fatty acids contain from 12 to 22 carbon atoms in their structures.

12. A method in accordance with the method set forth in claim 11, wherein said epoxidized natural glyceride of unsaturated fatty acids is an epoxidized soya bean oil.

13. The method of claim 1, wherein said composition contains in combination therewith and in addition thereto, up to about 2 percent by weight, based on the weight of the composition, of a non-toxic antioxidant for said cellulose ether.

14. The method of claim 1, wherein said composition contains in combination therewith and in addition thereto, up to about 2 percent by weight, based on the weight of the composition, of a hydroxy acid selected from the group consisting of citric acid and tartaric acid.

15. The method of claim 1, wherein the plasticizer component in said composition is acetyl tributyl citrate.

16. The method of claim 1, wherein the plasticizer component in said composition is butyl phthalyl butyl glycolate.

17. The method of claim 1, wherein the plasticizer component in said composition comprises a refined and deodorized castor oil.

18. A coated food article as produced by the method of claim 1.

References Cited in the file of this patent

UNITED STATES PATENTS

| | | |
|---|---|---|
| 2,082,592 | Nollau | June 1, 1937 |
| 2,349,134 | Bradshaw | May 16, 1944 |
| 2,373,278 | Traylor | Apr. 10, 1945 |
| 2,394,101 | Phillips et al. | Feb. 5, 1946 |
| 2,551,463 | Ramsbottom | May 1, 1951 |
| 2,558,042 | Cornwell | June 26, 1951 |
| 2,577,211 | Scharf | Dec. 4, 1951 |
| 2,682,475 | Smith | June 29, 1954 |
| 2,840,476 | Wirt et al. | June 24, 1958 |